(12) United States Patent
Setty et al.

(10) Patent No.: US 10,162,740 B1
(45) Date of Patent: Dec. 25, 2018

(54) AUTOMATED INTELLIGENT EXECUTION OF COMPUTER SOFTWARE TEST CASES

(71) Applicant: FMR LLC, Boston, MA (US)

(72) Inventors: Abhishek Chitlur Setty, Apex, NC (US); Balaji Chandrasekaran, Ontario (CA)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/806,163

(22) Filed: Nov. 7, 2017

(51) Int. Cl.
*G06F 11/36* (2006.01)
*G06F 9/44* (2018.01)
*G06F 11/07* (2006.01)
*G06F 9/445* (2018.01)
*G06F 8/60* (2018.01)

(52) U.S. Cl.
CPC ...... *G06F 11/3688* (2013.01); *G06F 9/44505* (2013.01); *G06F 11/3664* (2013.01); *G06F 11/3672* (2013.01); *G06F 11/3684* (2013.01); *G06F 11/3692* (2013.01); *G06F 8/60* (2013.01); *G06F 11/3616* (2013.01); *G06F 11/3668* (2013.01)

(58) Field of Classification Search
CPC ........ G06F 9/454; G06F 9/44; G06F 9/44505; G06F 8/70; G06F 11/368; G06F 11/3684; G06F 11/3664; G06F 11/36; G06F 11/3672; G06F 11/3688; G06F 11/3676; G06F 11/3616; G06F 11/3608; G06F 11/263; G06F 11/28; G06F 11/08; G06F 11/00; G06F 11/07; G06F 9/46
See application file for complete search history.

(56) References Cited

U.S. PATENT DOCUMENTS 6,249,882 B1   6/2001  Testardi
6,536,036 B1 *  3/2003  Pavela ............... G06F 11/3676
                                                      707/999.104

(Continued)

OTHER PUBLICATIONS

Domenico Amalfitano et al., MobiGuitar Automated Model-Based Testing of Mobile Apps, Sep./Oct. 2015, [Retrieved on Jul. 26, 2018]. Retrieved from the internet: <URL: https://ieeexplore.ieee.org/stamp/stamp.jsp?arnumber=6786194> 7 Pages (53-59) (Year: 2015).*

(Continued)

*Primary Examiner* — Anibal Rivera
(74) *Attorney, Agent, or Firm* — Proskauer Rose LLP (57) ABSTRACT

Methods and apparatuses are described for automated intelligent execution of computer software test cases. A server computing device identifies a plurality of computer software test cases for execution using a set of input parameters. For each computer software test case, the server selects an automation testing tool from a plurality of automated testing tools based upon one or more attributes of the software test case, launches the selected automation testing tool using a tool-specific interface, executes the software test case using the automation testing tool against a software application under development, receives one or more reports from the automation testing tool that include results of the software test case execution, parses the one or more reports to determine a status of the software test case execution, and transmits the status of the software test case execution to each of a software development issue tracking system and a software deployment system.

15 Claims, 6 Drawing Sheets

(56) References Cited

U.S. PATENT DOCUMENTS

| | | | |
|---|---|---|---|
| 6,694,509 B1 | 2/2004 | Stoval et al. | |
| 7,313,564 B2* | 12/2007 | Melamed | G06F 11/3684 707/999.01 |
| 7,490,319 B2 | 2/2009 | Blackwell et al. | |
| 7,900,192 B2 | 3/2011 | Patterson | |
| 8,151,276 B2 | 4/2012 | Grechanik et al. | |
| 8,205,191 B1 | 6/2012 | Kolawa et al. | |
| 8,276,123 B1* | 9/2012 | Deng | G06F 11/3688 714/37 |
| 8,539,282 B1* | 9/2013 | Kabanov | G06F 11/3688 702/182 |
| 8,561,036 B1 | 10/2013 | Beans et al. | |
| 8,645,341 B2 | 2/2014 | Salman et al. | |
| 8,732,676 B1 | 5/2014 | Kolawa et al. | |
| 8,893,089 B2 | 11/2014 | Rao et al. | |
| 8,949,673 B2* | 2/2015 | Rapp | G06F 11/3672 714/38.1 |
| 8,972,946 B2 | 3/2015 | Bullard et al. | |
| 8,984,340 B2* | 3/2015 | Ahmed | G06F 11/3688 711/125 |
| 9,047,414 B1 | 6/2015 | Matyjek | |
| 9,053,238 B2 | 6/2015 | Krishnan et al. | |
| 9,092,578 B2* | 7/2015 | Wefers | G06F 11/3688 |
| 9,116,779 B2* | 8/2015 | McClamroch | G06F 8/71 |
| 9,117,028 B2 | 8/2015 | Norton et al. | |
| 9,135,147 B2 | 9/2015 | Artzi et al. | |
| 9,304,893 B1* | 4/2016 | Knjazihhin | G06F 11/3684 |
| 9,361,211 B2* | 6/2016 | Gupta | G06F 11/3688 |
| 9,411,710 B2 | 8/2016 | Kumar et al. | |
| 9,507,698 B2 | 11/2016 | Vikutan et al. | |
| 9,582,408 B1* | 2/2017 | Jayaraman | G06F 11/3688 |
| 9,606,900 B1* | 3/2017 | Pradhan | G06F 11/368 |
| 9,824,002 B2* | 11/2017 | Shann | G06F 11/3664 |
| 9,892,015 B2* | 2/2018 | Nikam | G06F 11/3608 |
| 9,898,393 B2* | 2/2018 | Moorthi | G06F 11/368 |
| 2004/0107415 A1 | 6/2004 | Melamed | G06F 11/3684 717/124 |
| 2005/0188271 A1 | 8/2005 | West et al. | |
| 2005/0204367 A1* | 9/2005 | Minium, Jr. | G06F 9/541 719/328 |
| 2005/0223361 A1 | 10/2005 | Belbute | |
| 2005/0229159 A1* | 10/2005 | Haba | G06F 11/3672 717/122 |
| 2006/0041440 A1* | 2/2006 | Cheng | G06Q 10/06 705/7.17 |
| 2007/0130561 A1* | 6/2007 | Siddaramappa | G06F 8/10 717/106 |
| 2007/0240116 A1* | 10/2007 | Bangel | G06F 11/3664 717/124 |
| 2007/0245327 A1 | 10/2007 | Dietz et al. | |
| 2008/0282220 A1* | 11/2008 | Krueger | G06F 8/71 717/104 |
| 2009/0100430 A1* | 4/2009 | Valentin | G06F 9/4843 718/102 |
| 2009/0307763 A1* | 12/2009 | Rawlins | G06F 9/44505 726/5 |
| 2011/0219359 A1* | 9/2011 | Gupta | G06F 9/44 717/124 |
| 2012/0023485 A1 | 1/2012 | Dubey et al. | |
| 2012/0042210 A1* | 2/2012 | Glaser | G06F 11/3684 714/38.1 |
| 2012/0159422 A1* | 6/2012 | McClamroch | G06F 11/3672 717/101 |
| 2013/0042222 A1* | 2/2013 | Maddela | G06F 8/70 717/124 |
| 2013/0047140 A1* | 2/2013 | Shann | G06F 11/3664 717/128 |
| 2013/0152047 A1* | 6/2013 | Moorthi | G06F 11/368 717/124 |
| 2013/0198320 A1* | 8/2013 | Ahmed | G06F 11/3664 709/217 |
| 2013/0198567 A1* | 8/2013 | Ahmed | G06F 11/3684 714/32 |
| 2013/0198568 A1* | 8/2013 | Ahmed | G06F 11/3684 714/32 |
| 2013/0298110 A1 | 11/2013 | Boden et al. | |
| 2013/0318402 A1* | 11/2013 | Rapp | G06F 11/3672 714/38.1 |
| 2014/0172512 A1 | 6/2014 | Chandra et al. | |
| 2014/0181590 A1* | 6/2014 | Wefers | G06F 11/3688 714/38.1 |
| 2014/0380278 A1 | 12/2014 | Dayan | |
| 2015/0082277 A1* | 3/2015 | Champlin-Scharff | G06F 9/454 717/120 |
| 2015/0227452 A1* | 8/2015 | Raghavan | G06F 11/3684 717/124 |
| 2015/0254171 A1* | 9/2015 | Harden | G06F 17/30563 717/124 |
| 2015/0254173 A1* | 9/2015 | Gupta | G06F 11/3688 714/38.1 |
| 2015/0324274 A1* | 11/2015 | Raghavan | G06F 11/3684 717/124 |
| 2015/0339213 A1* | 11/2015 | Lee | G06F 11/3664 717/125 |
| 2015/0378722 A1* | 12/2015 | Zuniga-Hernandez | G06F 8/60 717/103 |
| 2016/0062876 A1* | 3/2016 | Narayanan | G06F 11/3684 717/130 |
| 2016/0117239 A1* | 4/2016 | Hamilton, II | G06F 11/3684 717/124 |
| 2016/0188450 A1* | 6/2016 | Appusamy | G06F 11/3664 714/38.1 |
| 2016/0217062 A1 | 7/2016 | Singi et al. | |
| 2016/0274994 A1* | 9/2016 | Nikam | G06F 11/3608 |
| 2017/0052877 A1* | 2/2017 | Ganda | G06F 11/3664 |
| 2017/0060730 A1* | 3/2017 | Li | G06F 11/3616 |
| 2017/0132119 A1* | 5/2017 | Xu | G06F 11/3676 |
| 2017/0249240 A1* | 8/2017 | Splichal | G06F 11/3672 |
| 2017/0289008 A1* | 10/2017 | Lau | H04L 43/14 |
| 2017/0344467 A1* | 11/2017 | Yadav | G06F 11/3684 |
| 2018/0032331 A1* | 2/2018 | Desai | G06F 17/2785 |
| 2018/0046453 A1* | 2/2018 | Nair | G06F 8/70 |
| 2018/0046569 A1* | 2/2018 | Hisagi | G06F 11/3672 |
| 2018/0048520 A1* | 2/2018 | Nair | H04L 41/0806 |
| 2018/0048521 A1* | 2/2018 | Nair | G06F 8/60 |

OTHER PUBLICATIONS

Frank Pfenning et al., Generative Programming and Component Engineering, 2003, [Retrieved on Jul. 26, 2018]. Retrieved from the internet: <URL: https://link.springer.com/content/pdf/10.1007%2Fb13639.pdf> 407 Pages (1-395) (Year: 2003).*

De Santiago Jr., V.A. & Vijaykumar, N.L., "Generating model-based test cases from natural language requirements for space application software," Software Qual. J., Springer Science+Business Media, published Jul. 31, 2011, 67 pages.

Morgan, Charles P. et al., "ATCG: An Automated Test Case Generator," Journal of Information Technology Management, vol. XXVII, No. 3, 2016, pp. 112-120.

Tummalapenta, Suresh et al., "Automating Test Automation," ICSE 2012, Zurich, Switzerland, 2012, pp. 881-891.

Singi, Kapil et al., "Generation of Relevant Test Conditions from Natural Language Software Requirements," Software Testing Conference, 2013, 15 pages.

George, N. & Selvakumar, J., "Model Based Test Case Generation from Natural Language Requirements and Inconsistency, Incompleteness Detection in Natural Language using Model-Checking Approach," International Journal of Advanced Research in Computer Engineering & Technology (IJARCET), vol. 2, Issue 4, Apr. 2013, pp. 1565-1573.

Masuda, Satoshi et al., "Automatic Generation of Test Cases using Document Analysis Techniques," International Journal of New Technology & Research (IJNTR), vol. 2, Issue 7, Jul. 2016, pp. 59-64.

Parasoft Corporation, "Test-Driven Development and Unit Testing with Parasoft Concerto," dated 2010, 10 pages.

(56) References Cited

OTHER PUBLICATIONS

Hornbeek, M., "Continuous Change-Driven Build Verification," Spirent Communications, dated 2011, 11 pages.

* cited by examiner

| <<Test>> | |
| wiqa.tools.runner.automation.tools | |
| Properties | -run:boolean;<br>-environment:Environments;<br>-testwithlocation:String;<br>-toolname:String;<br>-batonToRun:boolean; |

FIG. 3

```
public Itools tool = null;

@Override
public STATUS run (Test t) {
    ToolType currentTool = t.getToolName();

If (previousTool != currentTool && previousTool != null)
    {
        if(tool != null)
        {
                tool.stop();
                tool = t.getTool();
        } else {
                tool = t.getTool();
        }
        tool.start();
    } else {
        tool = t.getTool();
    } if (!tool.isRunning())
    {
        tool.start();
        while(!tool.isRunning()){
                try {
                        Thread.sleep(1000);
                } catch (InterruptedException e) {
                        e.printStackTrace();
                }
        }
        try {
                Thread.sleep(2000);
        } catch (InterruptedException e) {
                e.printStackTrace();
        }
    }
    tool.run(t);
    tool.updateResults();
    Return tool.getStatus();
}
```

AUTOMATED INTELLIGENT EXECUTION OF COMPUTER SOFTWARE TEST CASES

TECHNICAL FIELD

This application relates generally to methods and apparatuses, including computer program products, for automated intelligent execution of computer software test cases.

BACKGROUND

Recently, the term 'DevOps' (compound of 'development' and 'operations') has been coined to describe a software development process that strives to develop, test, and deploy complex software applications in a seamless, frequent, and efficient manner. In order to accomplish this goal, the software testing process must become much more integrated with the software development process so that source code can be written, compiled, tested, and deployed to production environments without unnecessary delays.

However, most current software testing processes rely on a wide variety of automation testing tools (e.g., Sahi, Selenium) to automatically execute test cases against production software applications and environments. However, these automation testing tools typically require different configuration parameters, have different dependencies based upon the source code and application being tested, and provide different test reports and error codes. In some cases, the automation testing tools may be limited to executing test cases written in a specific language or customized for a certain type of application. Therefore, it is difficult to automatically and seamlessly execute computer software test cases for the same application and/or code base when different automation testing tools are required.

In addition, there is typically a lack of integration between the various systems that software developers and testers use, such as source code management systems (e.g., Git), software development issue tracking systems (e.g., JIRA) and software automation and deployment systems (e.g., Jenkins, uDeploy). Thus, changes to source code are typically not automatically recognized by software automation and testing systems for execution of related software tests, and similarly, results of software testing are not automatically communicated to issue tracking systems for remediation of errors in the application under development. Such results of testing are also not typically transmitted to application deployment systems to ensure that a stable build is available in the production software environment.

SUMMARY

Therefore, what is needed are methods and systems for automatically executing computer software test cases applicable to a range of applications and a plurality of different software automation testing tools, and intelligently analyzing the results of such software testing to generate action items for software development tracking systems and to regulate the deployment of code builds to a production application. The techniques described herein provide for test automation orchestration that acts as an abstraction layer to eliminate the dependency on a wide array of tools in the DevOps process such as test management, source code management and build management tools. If these tools change, the system can efficiently and rapidly adapt by simply adjusting one layer of the technical infrastructure, instead of multiple levels, which significantly streamlines the development effort and results.

The invention, in one aspect, features a system for automated intelligent execution of computer software test cases. The system comprising a server computing device that identifies a plurality of computer software test cases for execution using a set of input parameters. For each computer software test case, the server computing device selects an automation testing tool from a plurality of automated testing tools based upon one or more attributes of the computer software test case, launches the selected automation testing tool using a tool-specific interface, executes the computer software test case using the automation testing tool against a software application under development, receives one or more reports from the automation testing tool that include results of the computer software test case execution, parses the one or more reports to determine a status of the computer software test case execution, and transmits the status of the computer software test case execution to each of a software development issue tracking system and a software deployment system.

The invention, in another aspect, features a computerized method of automated intelligent execution of computer software test cases. A server computing device identifies a plurality of computer software test cases for execution using a set of input parameters. For each computer software test case, the server computing device selects an automation testing tool from a plurality of automated testing tools based upon one or more attributes of the computer software test case, launches the selected automation testing tool using a tool-specific interface, executes the computer software test case using the automation testing tool against a software application under development, receives one or more reports from the automation testing tool that include results of the computer software test case execution, parses the one or more reports to determine a status of the computer software test case execution, and transmits the status of the computer software test case execution to each of a software development issue tracking system and a software deployment system.

The invention, in another aspect, features a computer program product, tangibly embodied in a non-transitory computer readable storage device, for automated intelligent execution of computer software test cases. The computer program product includes instructions that, when executed by a processor of a server computing device, cause the server computing device to identify a plurality of computer software test cases for execution using a set of input parameters. The computer program product includes instructions that, when executed by the processor, cause the server computing device to select an automation testing tool from a plurality of automated testing tools based upon one or more attributes of the computer software test case, launch the selected automation testing tool using a tool-specific interface, execute the computer software test case using the automation testing tool against a software application under development, receive one or more reports from the automation testing tool that include results of the computer software test case execution, parse the one or more reports to determine a status of the computer software test case execution, and transmit the status of the computer software test case execution to each of a software development issue tracking system and a software deployment system.

Any of the above aspects can include one or more of the following features. In some embodiments, the step of identifying a plurality of computer software test cases for execution using a set of input parameters comprises receiving, from a source code management system, an identification of a change to source code associated with a software application under development; identifying a plurality of computer software test cases that are (i) associated with the software application under development and (ii) associated with the changed source code; and retrieving, from the source code management system, one or more artifacts associated with the identified computer software test cases for use in selecting the automation testing tool and executing the computer software test case. In some embodiments, the server computing device selects the automation testing tool that executes the computer software test case based upon the one or more artifacts. In some embodiments, the server computing device identifies a test type for the computer software test case based upon the one or more artifacts and maps the test type to one of the plurality of automated testing tools.

In some embodiments, the set of input parameters includes an environment parameter and a pointer to a file that identifies the plurality of computer software test cases for execution. In some embodiments, the step of launching the selected automation testing tool using a tool-specific interface comprises determining whether the selected automation testing tool is available for use; and launching the selected automation testing tool if the selected automation testing tool is unavailable. In some embodiments, the step of launching the selected automation testing tool using a tool-specific interface comprises determining one or more tool-specific dependencies of the selected automation testing tool; and generating the tool-specific interface for the selected automation testing tool based upon the one or more tool-specific dependencies. In some embodiments, the tool-specific interface is a Java wrapper that calls one or more tasks of the selected automation testing tool based upon a tool-specific build file. In some embodiments, the tool-specific interface retrieves a tool-specific configuration file when the selected automation testing tool is launched. In some embodiments, the tool-specific configuration file defines one or more parameters used to configure the selected automation testing tool prior to execution of the computer software test case.

In some embodiments, the status of the computer software test case execution indicates whether the computer software test case successfully executed. In some embodiments, the step of parsing the one or more reports to determine a status of the computer software test case execution comprises identifying one or more tool-specific errors associated with the computer software test case execution in the one or more reports; and classifying the identified tool-specific errors into at least one tool-agnostic error type. In some embodiments, the step of transmitting the status of the computer software test case execution to each of a software development issue tracking system and a software deployment system comprises generating an issue ticket for the software development issue tracking system, wherein the issue ticket is assigned to a particular workgroup based upon the tool-agnostic error type associated with the computer software test case execution; and transmitting the issue ticket to the software development issue tracking system. In some embodiments, the step of transmitting the status of the computer software test case execution to each of a software development issue tracking system and a software deployment system comprises determining, by the software deployment system, whether to deploy a build associated with the application under development based upon the status of the computer software test case execution, wherein the software deployment system deploys the build when the status of the computer software test case execution indicates that the computer software test case successfully executed, and wherein the software deployment system reverts the application under development to an earlier build when the status of the computer software test case execution indicates that the computer software test case did not successfully execute.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
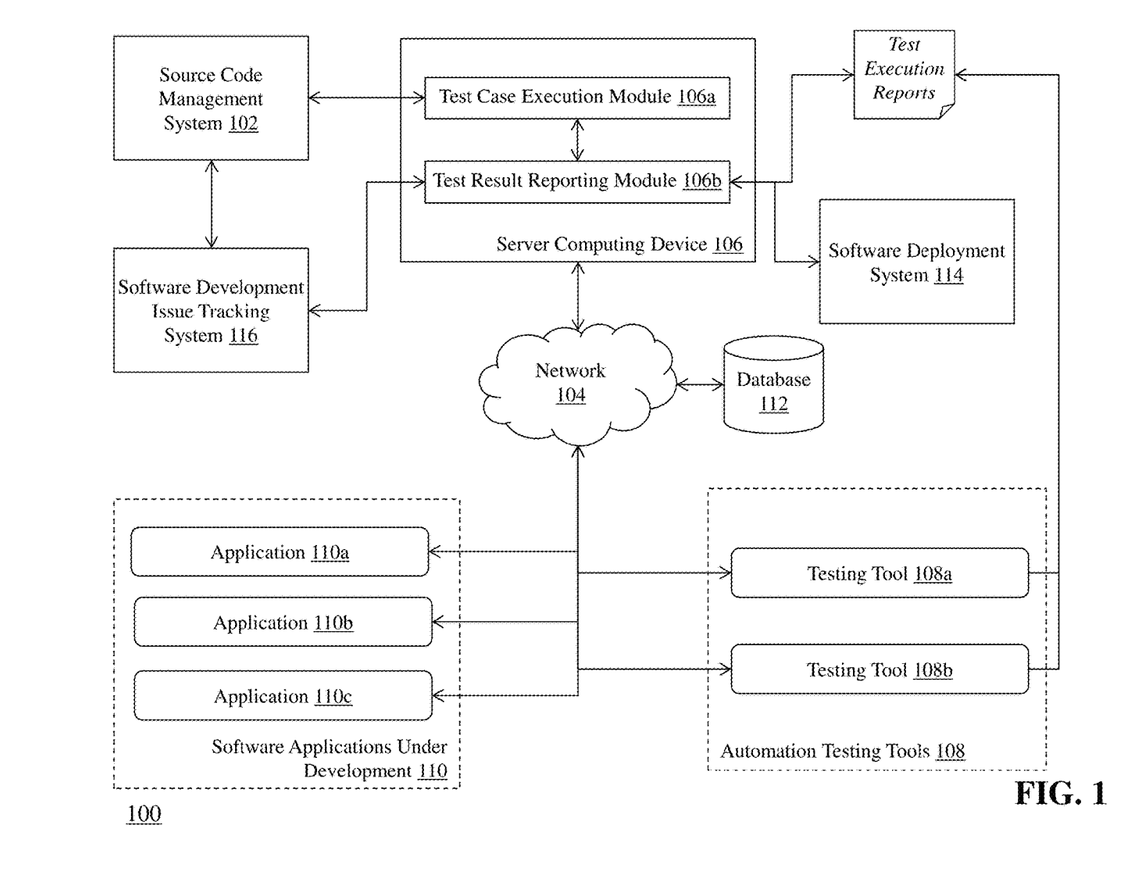
FIG. 1 is a block diagram of a system for automated intelligent execution of computer software test cases.

FIG. 1 is a block diagram of a system 100 for automated intelligent execution of computer software test cases. The system 100 includes a source code management system 102, a communications network 104, a server computing device 106 with several computing modules, including a test case execution module 106a and a test result reporting module 106b. The system 100 also includes a plurality of automation testing tools 108—including testing tool 108a and testing tool 108b, and a plurality of software applications under development 110—including application 110a, application 110b, and application 110c. The system 100 also includes a database 112, a software deployment system 114, and a software development issue tracking system 116.

The source code management system 102 is a computing device that tracks changes in source code and other related files during the development of a software application (e.g., applications 110a, 110b, 110c). The source code management system 102 can be a source code control system and/or a version control system, such as JIRA available from Atlassian, Inc., that provides the capability of entering issue tickets pertaining to source code errors, bugs, and associated changes that can be assigned to software developers for iteration on the code base.

The communications network 104 enables the other components of the system 100 to communicate with each other in order to perform the process of automated intelligent execution of computer software test cases as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware and software modules that includes specialized hardware and/or software modules that execute on a processor and interact with memory modules of the server computing device 106 to perform functions for automated intelligent execution of computer software test cases as described herein. The server computing device 106 includes a test case execution module 106a and a test result reporting module 106b (as mentioned above) that execute on and/or interact with the processor of the server computing device 106.

In some embodiments, the test case execution module 106a and the test result reporting module 106b are specialized sets of computer software instructions programmed onto one or more dedicated processors in the server computing device 106 and can include specifically-designated memory locations and/or registers for executing the specialized computer software instructions. Although the modules 106a, 106b are shown in FIG. 1 as executing within the same server computing device 106, in some embodiments the functionality of the modules 106a, 106b can be distributed among a plurality of server computing devices. As shown in FIG. 1, the server computing device 106 enables the modules 106a, 106b to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 106a, 106b is described in detail below.

The automation testing tools 108a and 108b (collectively, 108) are software applications, implemented on any of a number of operating system platforms (e.g., OS X, Windows, Linux), that are configured to automatically execute test cases against target software applications—such as applications under development 110. Exemplary automation testing tools include, but are not limited, to Selenium (available from http://www.seleniumhq.com) and Sahi (available from http://sahipro.com). The automation testing tools 108 are programmed to receive test cases that are either written in a programming language that is specific to the automation testing tool (e.g., Selenese for Selenium) and/or the tools 108 can be configured with an application programming interface (API) that receives test case instructions in another programming language (e.g., Java, C#, Ruby, Python, JavaScript, and the like) and converts the received instructions into tool-specific instructions. To execute the test cases, the computing devices that host the automation testing tools 108 establish a connection to the computing devices that host the software applications under development 110 and, using the connection, execute test case instructions to cause the applications 110 to perform actions. The tools 108 can capture and otherwise receive data resulting from execution of the test cases from the applications 110.

As mentioned above, the software applications under development 110a, 110b, 110c (collectively, 110) are applications that comprise the source code managed by the source code management system 102. In some embodiments, the applications 110 are operated using browser software located on computing devices. Exemplary browser software includes, but is not limited to, Mozilla Firefox™ available from Mozilla Corp., Google Chrome™ available from Google Inc., Safari available from Apple Inc., and Microsoft Edge™ available from Microsoft Corp. The applications 110 can comprise browser software installed on a computing device that is launched upon receipt of a particular Uniform Resource Identifier (URI), such as a web address or URL. In some embodiments, the browser-based applications 110a-110c are directed to a URI that references functionality on the server computing device 108 (e.g., a web server configured to serve a web-based application). The applications 110 communicate with the automation testing tools 108 in order to execute functionality according to test case instructions received from the tools 108.

The database 112 is a computing device (or in some embodiments, a set of computing devices) coupled to the server computing device 106 and is configured to receive, generate, and store specific segments of data relating to the process of automated intelligent execution of computer software test cases as described herein. In some embodiments, all or a portion of the database 112 can be integrated with the server computing device 106 or be located on a separate computing device or devices. The database 112 can comprise one or more databases configured to store portions of data used by the other components of the system 100, as will be described in greater detail below. An exemplary database 112 is MySQL™ available from Oracle Corp. of Redwood City, Calif.

The software deployment system 114 is a computing device that initiates deployment of new builds of application software to, e.g., testing and/or production environments. As will be explained in greater detail below, the software deployment system 114 can receive test results from the reporting module 106b and use the test results to determine whether to deploy a new build of the source code to a testing and/or production server, or whether to revert an existing build on a testing and/or production server to an earlier version (e.g., if there are errors or other problems in the build under test). Exemplary software deployment systems include uDeploy available from IBM Corp. as integrated with Jenkins available from http://github.com/jenkinsci/jenkins.

The software development issue tracking system 116 is a computing device that tracks issue tickets associated with errors or problems in the source code (e.g., such as errors identified by automated testing of applications) and assigns the tickets to developers or other workgroups for remediation and resolution. It should be appreciated that the source code management system 102 and the software development issue tracking system 116 can be located on the same computing device (or separate computing devices), and in some embodiments, the source code management system 102 and the software development issue tracking system 116 are components of the same software application (such as JIRA or Git).

Figure 2:
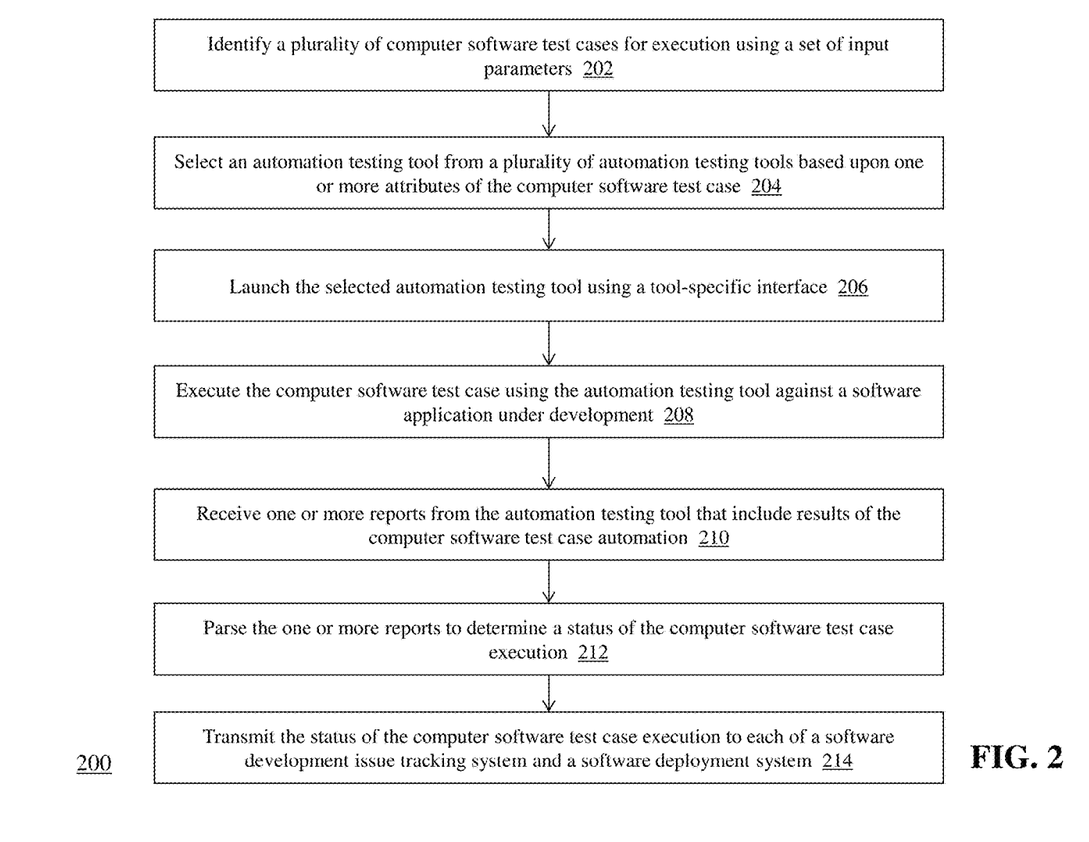
FIG. 2 is a flow diagram of a computerized method of automated intelligent execution of computer software test cases.

FIG. 2 is a flow diagram of a method 200 of automated intelligent execution of computer software test cases, using the system 100 of FIG. 1. As developers work on changes to the source code that comprises one or more of the software applications under development 110, the developers check in these source code changes to the source code management system 102. The test case execution module 106a periodically polls the source code management system 102 to identify any changes to the source code. When the module 106a detects source code changes (such as by receiving an identification of a change to source code), the module 106a identifies (202) a plurality of computer software test cases for execution using a set of input parameters. The module 106a can identify a plurality of computer software test cases that are (i) associated with the software application under development and (ii) associated with the changed source code. For example, the module 106a receives input parameters such as environment and a pointer (e.g., address, URI) to the location of a file that contains a list of test cases to execute (e.g., a .csv file). In some cases, the module 106a receives the input parameters from the source code management system 102 and/or another test automation system at runtime. The test case execution module 106a then retrieves the file containing the list of test cases to execute from, e.g., database 112 or a code repository such as GitHub. In some embodiments, the test case execution module 106a crawls over the changes in the source code management system 102 and retrieves one or more artifacts associated with the identified computer software test cases for use in selecting an automation testing tool an executing the computer software test case. For example, for a Sahi environment, the test case execution module 106a can automatically look for and detect files with the extension ".sah," while for a Selenium environment (e.g., a Selenium test suite using a Maven build), the test case execution module 106a can automatically look for and detect the pom.xml file, and kick off the Selenium test suite. For a SOATest suite, the test case execution module 106a can automatically look for and detect files with the extension ".tst" and kick off the SOATest suite.

The module 106a can use the artifacts to select the automation testing tool that will be used to execute the test case. In some embodiments, the module 106a can identify a test type for the computer software test case based upon the one or more artifacts and map the test type to one of the plurality of automation testing tools. For example, the module 106a can associate the artifacts as being connected to a particular automation testing tool (e.g., Sahi, Selenium, Soatest) through the use of a mapping file.

Figure 3:
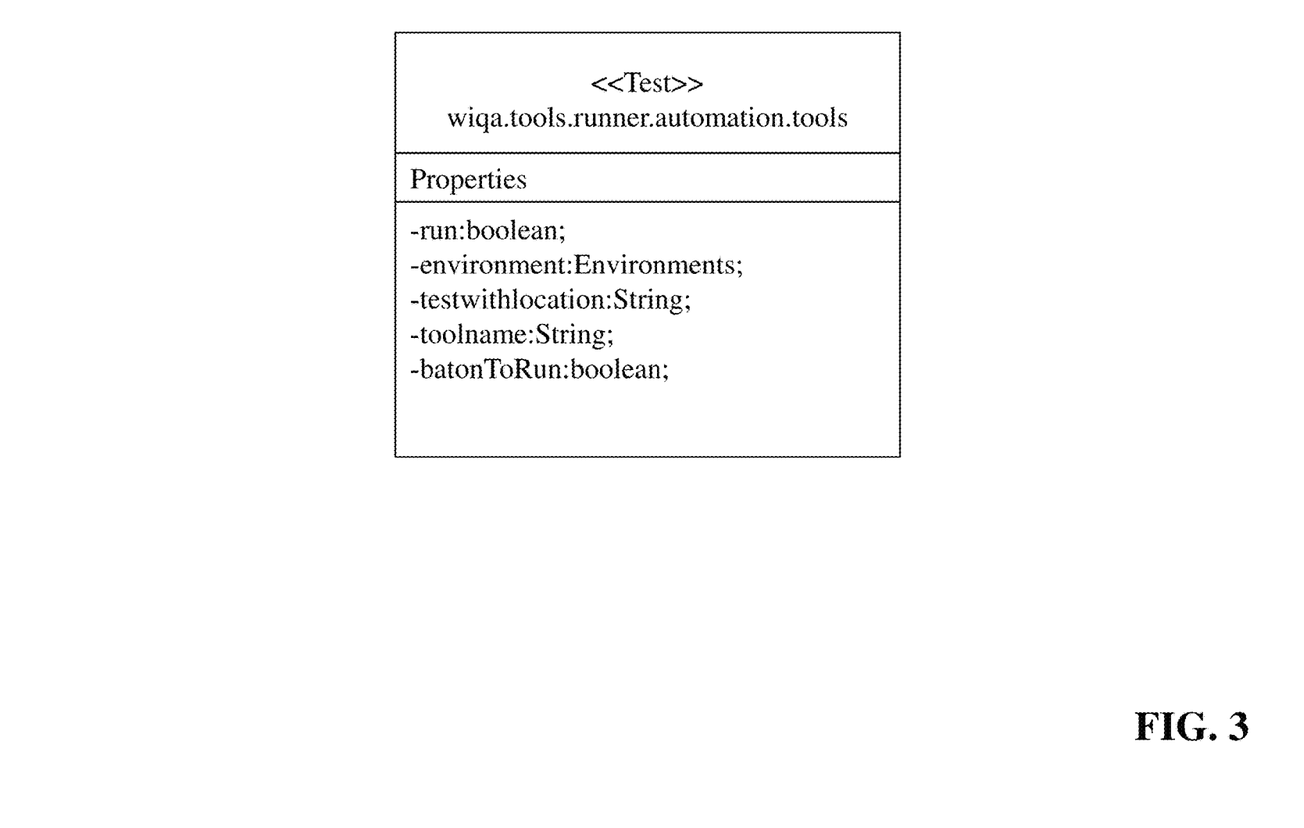
FIG. 3 depicts an example of a mapping .csv file row for use in executing a computer software test case.

In one embodiment, the file retrieved by the test case execution module 106a is a mapping .csv file that contains a plurality of rows, each of which corresponds to a test case and the associated test case properties. An example of a row of the mapping .csv file is shown in FIG. 3. The test case execution module 106a converts each row in the mapping file into a class (e.g., "Test") with the structure shown in FIG. 3. Each mapping file row includes a test name (<<Test>>), a class type (wiqa.tools.runner.automation.tools), and a series of properties (run, environment, testwithlocation, toolname, batonToRun).

The properties are defined as:
run—Boolean value, takes values "yes," "no," empty space, "y," or "n" and converts them to "true" or false." For example, "yes" indicates that the test case execution module 106a must run this test case. "No" indicates that the test case execution module 106a should exclude this test case.
environment—corresponds to application environment; the table below has exemplary notations for each environment:

| Environment | Values |
| --- | --- |
| Acceptance | FAC, ACPT, acp |
| Integration | Int, fin |
| Dev Int | Any string containing "dev," e.g., devint, dev-int, nbdev01, etc. | testwithlocation—partial location of the test in the repository; this value is combined with the base location at runtime in order to retrieve the test to be executed.
toolname—name of the automation testing tool used to execute the test case (e.g., SAHI, SOATEST, SEETEST).
batonToRun—Boolean value to handle failures; takes values "yes" or "no;" "yes" continues execution even if the current test case fails; "no" stops execution and throws a failure.

Figure 4:
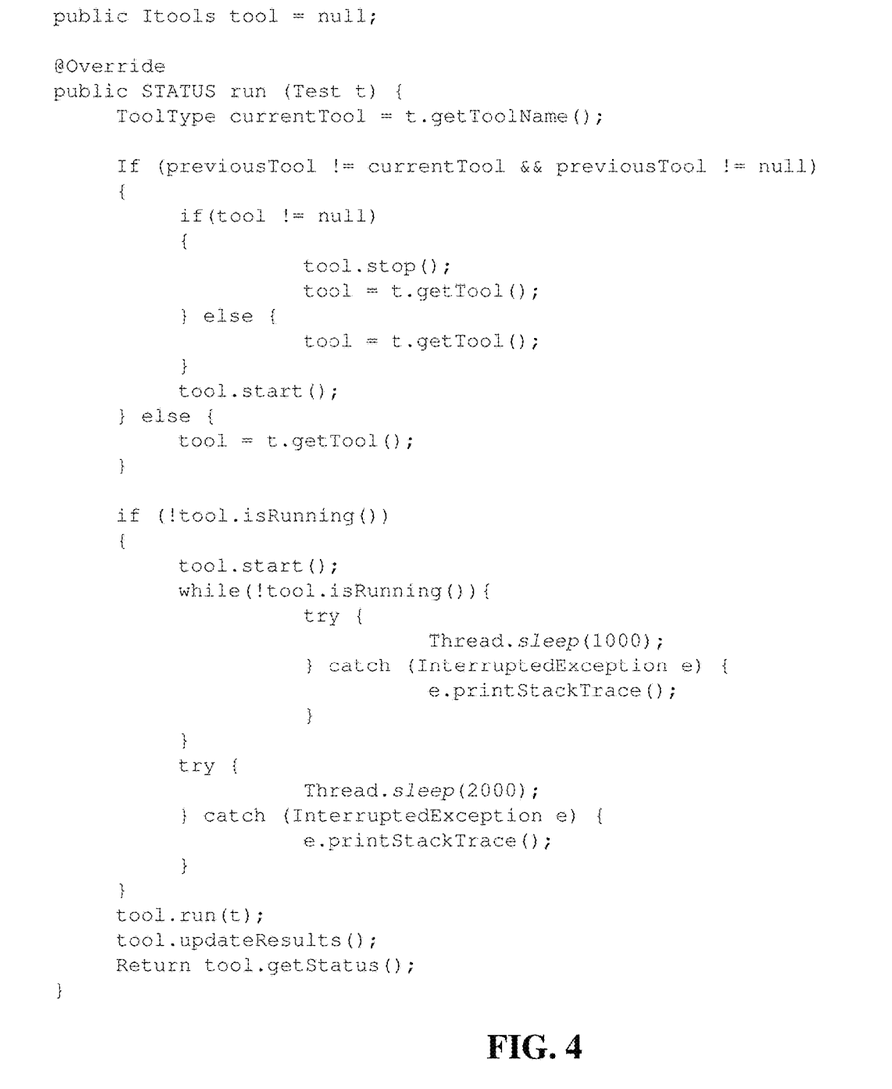
FIG. 4 depicts an example programmatic method for launching an automated testing tool and executing a computer software test case.

Turning back to FIG. 2, the test case execution module 106a performs a series of steps for each computer software test case to be executed. The module 106a selects (204) an automation testing tool from a plurality of automated testing tools based upon one or more attributes of the computer software test case, launches (206) the selected automation testing tool using a tool-specific interface, and executes (208) the computer software test case using the automation testing tool against a software application under development. In one embodiment, the module 106a implements a ITestRunner Java interface which has one method ("run") that takes in a parameter identifying the computer software test case to be executed and returns a status of the execution. The ITestRunner interface has one implementation class— "Runner"—to establish the execution of the test case. The "Runner" class takes control of launching the automation testing tool, executing the test case, parsing the test results, and determining the status of the test case execution. The "run" method of the "Runner" class gets a reference to the automation testing tool for the current test case, which assists the module 106a in communicating with the automation testing tool. Example code for implementing the "run" method is shown in FIG. 4.

Figure 5:
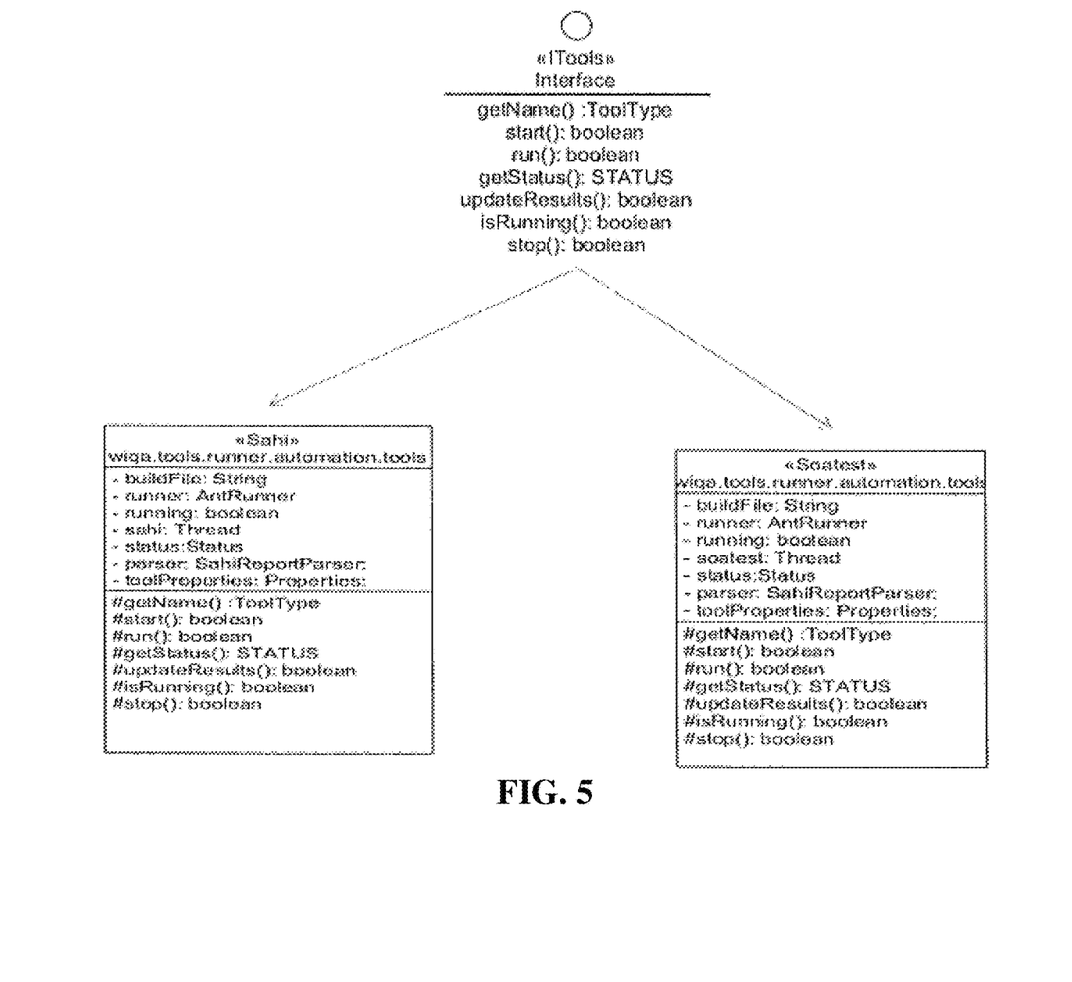
FIG. 5 depicts automation testing tool-specific implementations of an interface class to the automation testing tools.

As mentioned above, because each testing tool may have different ways to execute test cases, in order to interact with a specific automation testing tool to launch, execute, and get test results, the test case execution module 106a requires each tool to implement a tool-specific interface. To accomplish this, the test case execution module 106a can implement an iTools interface class that has certain methods to interact with each tool (e.g., to start the tool, execute a test case, parse and update the test results, etc.). Then, each tool can implement the iTools interface class with tool-specific features that define the tool's individual operation for launching the tool, executing the test case, and returning results and/or status of the test case). FIG. 5 shows tool-specific implementations of the iTools class for Sahi and Soatest—for example, the "start( )" method for Sahi is associated with the Sahi-specific technique for starting the tool, and so forth.

In addition, while implementing the iTools interface, the module 106a receives dependencies associated with the automation testing tool that is executing the test case. For example, each automation testing tool has differences with respect to, e.g., location of the tool, libraries associated with the tool, and the like. In one embodiment, the implementations of the iTools interface uses the Ant build language to load dependencies dynamically and execute custom tasks at runtime. The test case execution module 106a can leverage a build.xml file of Ant to take control of the tool's execution of tasks. As a result, the module 106a can take advantage of error handling when it calls tasks at runtime because errors thrown by the automation testing tools when executing the test cases are captured by the test case execution module 106a as it wraps the Ant execution.

Also, the tool-specific interface can be configured to retrieve a tool-specific configuration file when the selected automation testing tool is launched. For example, an automation testing tool may need to access certain configuration information and parameters such as host and port it uses to start, location of the execution file. This configuration information can be stored in a file that is loaded by the tool-specific interface.

It should also be appreciated that the test case execution module 106a can leverage Ant to execute itself upon detecting changes in the source code. In one embodiment, the module 106a itself can be defined in a build.xml file as an Ant task. Then, to call the Ant task, a user can create a shell file or a batch file to execute the module 106a Ant task according to the requirements. In one example, a build.xml file has the module 106a task defined according to six parameters (shown in the table below):

| Parameter | Value |
| --- | --- |
| logDirectory | Location to store logs; should be accessible from the computing device (e.g., device 106) where the module 106a executes |
| mappingFileName | Name of the mapping file |
| environment | Environment to be used to filter the test cases; refer to the values in the table above |
| version | Version of the application to be tested |
| testSuiteFolder | Location of the mapping file |
| mailTo | Comma-separated valid mail IDs as strings |

Once the test case execution module 106a has coordinated the execution of the plurality of computer software test cases as described above, the test result reporting module 106b of server computing device 106 automatically receives test execution reports from each of the testing tools 108a, 108b that executed one or more of the test cases. These test execution reports can include log files from the automation testing tools that relate to execution of the specific test case(s). As set forth in FIG. 2, the test case reporting module 106b receives (210) one or more reports from the automation testing tool that include results of the computer software test case execution. The module 106b parses (212) the one or more reports to determine a status of the computer software test case execution. The module 106b also transmits (214) the status of the computer software test case execution to each of a software development issue tracking system 216 and a software deployment system 214. In one embodiment, the status of the computer software test case execution indicates whether the corresponding test case was successfully executed or not. For example, the status can be a Boolean value that indicates a successful test (TRUE) or an unsuccessful test (FALSE).

Figure 6:
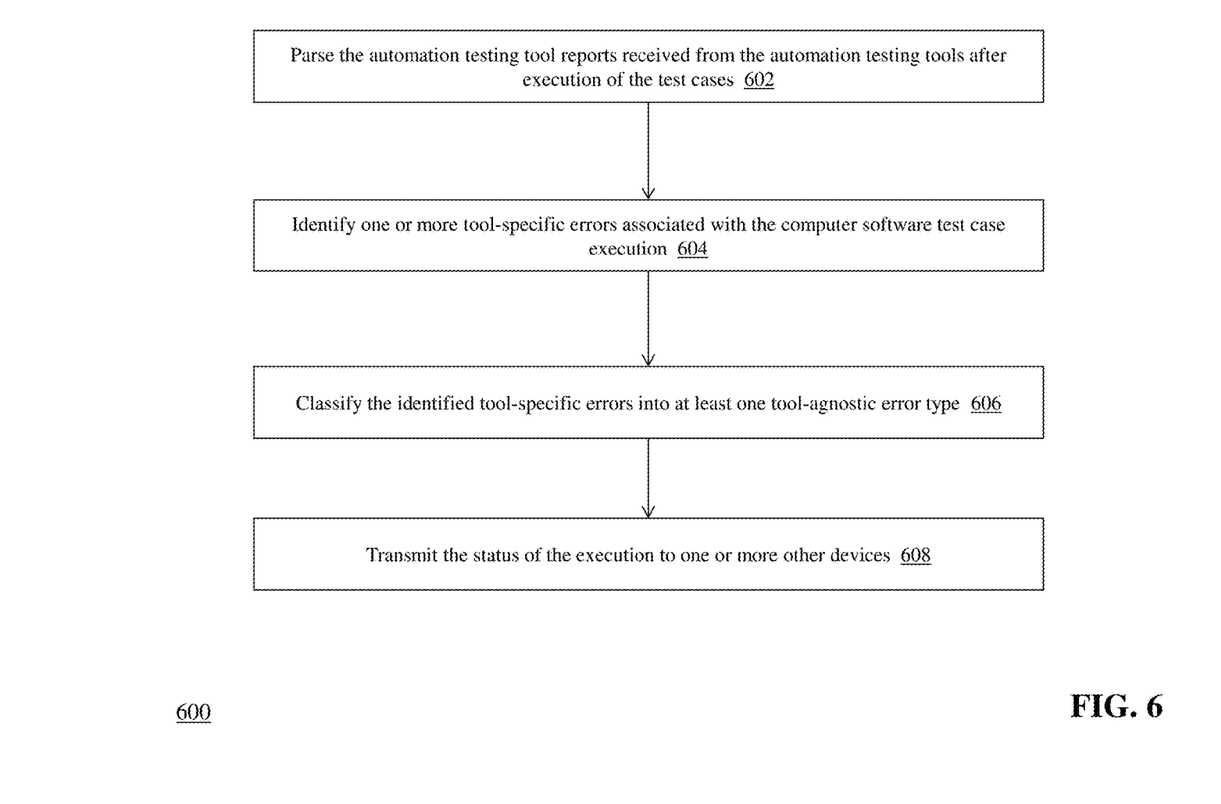
FIG. 6 is a flow diagram of a method of parsing test case execution reports and classifying one or more errors in the test case execution reports.

FIG. 6 is a flow diagram of a method 600 of parsing test case execution reports and classifying one or more errors in the test case execution reports, using the system 100 of FIG. 1. The test case reporting module 106b parses (602) the automation testing tool reports received from the various testing tools 108 after execution of the test cases is complete. In one embodiment, the test case reporting module 106b analyzes the reports line-by-line, identifies errors in the reports (e.g., via error code matching), and extracts relevant error information from the reports. The module 106b identifies (604) one or more tool-specific errors associated with the computer software test case execution.

The test case reporting module 106b classifies (606) the identified tool-specific errors into at least one tool-agnostic error type. For example, the module 106b can associate the tool-specific error with one or more tool-agnostic error types using, e.g., an error classification table stored in database 112. The tool-agnostic error types may be more generalized versions of the specific errors—such as a "data" error type, an "application" error type, or a "functionality" error type. For each tool-agnostic error type, the module 106b can perform different actions, such as transmitting (608) the status of the execution, the error type, and/or related information to one or more other devices, such as the software deployment system 114 and the software development issue tracking system 116.

For example, based upon the tool-agnostic error type, the module 106b may generate an issue ticket for the software development issue tracking system 114 and assign the issue ticket to a particular development workgroup (e.g., Business Analytics, Development, Testing) for follow-up and remediation in the development system. The module 106b can then interface with the issue tracking system 114 to put the newly-generated issue ticket in queue for further development and testing cycles.

In another example, the module 106b can transmit the error type, the status of the execution, and/or related information to the software deployment system 114. The software deployment system 114 can determine whether to deploy a build associated with the software application under development 110 based upon the received test result information. For example, if the test result information indicates that errors occurred during testing of the application, the software deployment system 114 may decide not to deploy the build to a production environment, or the system 114 may decide to revert an existing production or testing build to an earlier version due to the existence of the errors. In another example, the software deployment system 114 may proceed to deploy the build when the status of the computer software test case execution indicates that the computer software test successfully executed without errors.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated intelligent execution of computer software test cases, the system comprising:
   a plurality of automation testing tools, each running on a separate computing device;
   a plurality of software applications under development, each located on a separate computing device and comprising a browser-based software application; and
   a server computing device coupled to the computing devices of the plurality of automation testing tools and to the computing devices of the plurality of software applications under development, that:

identifies a plurality of computer software test cases for execution using a set of input parameters comprising a URI for a file containing a list of computer software test cases; and for each computer software test case in the file:

scans code changes in a source code management system for source code associated with the computer software test case to retrieve one or more artifacts associated with the code changes, the artifacts comprising at least one of a file extension or a file name, identifies a test type based upon the one or more artifacts, selects an automation testing tool by mapping the test type to one of the plurality of automation testing tools using a mapping file stored on the server computing device, launches the selected automation testing tool using a tool-specific interface that comprises an interface class containing one or more methods implemented only for the selected automation testing tool, the tool-specific interface generated by loading one or more dependencies needed for operation of the selected automation testing tool, executes the computer software test case, using the interface class for the selected automation testing tool, against one or more of the software applications under development by configuring the selected automation testing tool using a configuration file, and initiating execution of the selected automation testing tool using a build file, receives one or more reports from the automation testing tool that include results of the computer software test case execution, parses the one or more reports to determine a status of the computer software test case execution, and transmits the status of the computer software test case execution to each of a software development issue tracking system and a software deployment system, wherein the software development issue tracking system generates an issue ticket based upon the status of the computer software test case execution and assigns the issue ticket to a development workgroup for changing source code associated with one or more of the software applications under development, and wherein the software deployment system determines whether to deploy a build associated with one or more of the software applications under development based upon the status of the computer software test case execution.

2. The system of claim 1, wherein launching the selected automation testing tool using a tool-specific interface comprises:

determining whether the selected automation testing tool is available for use; and launching the selected automation testing tool if the selected automation testing tool is unavailable.

3. The system of claim 1, wherein the tool-specific interface is a Java wrapper that calls one or more tasks of the selected automation testing tool using the interface class and based upon a tool the build file.

4. The system of claim 1, wherein the configuration file defines a host and a port used to start the selected automation testing tool prior to execution of the computer software test case.

5. The system of claim 1, wherein the status of the computer software test case execution indicates whether the computer software test case successfully executed.

6. The system of claim 1, wherein parsing the one or more reports to determine a status of the computer software test case execution comprises:

identifying one or more tool-specific errors associated with the computer software test case execution in the one or more reports; and classifying the identified tool-specific errors into at least one tool-agnostic error type.

7. The system of claim 6, wherein the software deployment system deploys the build when the status of the computer software test case execution indicates that the computer software test case successfully executed, and wherein the software deployment system reverts the application under development to an earlier build when the status of the computer software test case execution indicates that the computer software test case did not successfully execute.

8. A computerized method of automated intelligent execution of computer software test cases, the method comprising:

identifying, by a server computing device, a plurality of computer software test cases for execution using a set of input parameters comprising a URI for a file containing a list of computer software test cases; and for each computer software test case in the file:

scanning, by the server computing device, code changes in a source code management system for source code associated with the computer software test case to retrieve one or more artifacts associated with the code changes, the artifacts comprising at least one of a file extension or a file name, identifying, by the server computing device, a test type based upon the one or more artifacts, selecting, by the server computing device, an automation testing tool of a plurality of automation testing tools, each running on a separate computing device coupled to the server computing device, by mapping the test type to one of the automation testing tools using a mapping file stored on the server computing device, launching, by the server computing device, the selected automation testing tool using a tool-specific interface that comprises an interface class containing one or more methods implemented only for the selected automation testing tool, the tool-specific interface generated by loading one or more dependencies needed for operation of the selected automation testing tool, executing, by the server computing device, the computer software test case using the interface class for the selected automation testing tool, against one or more software applications under development, each located on a separate computing device coupled to the server computing device and each comprising a browser-based software application, by configuring the selected automation testing tool using a configuration file, and initiating execution of the selected automation testing tool using a build file, receiving, by the server computing device, one or more reports from the automation testing tool that include results of the computer software test case execution, parsing, by the server computing device, the one or more reports to determine a status of the computer software test case execution, and transmitting, by the server computing device, the status of the computer software test case execution to each of a software development issue tracking system and a software deployment system, wherein the software development issue tracking system generates an issue ticket based upon the status of the computer software test case execution and assigns the issue ticket to a development workgroup for changing source code associated with one or more of the software applications under development, and wherein the software deployment system determines whether to deploy a build associated with the software application under development based upon the status of the computer software test case execution.

9. The method of claim 8, wherein the step of launching the selected automation testing tool using a tool-specific interface comprises:

determining, by the server computing device, whether the selected automation testing tool is available for use; and launching, by the server computing device, the selected automation testing tool if the selected automation testing tool is unavailable.

10. The method of claim 8, wherein the tool-specific interface is a Java wrapper that calls one or more tasks of the selected automation testing tool based upon the build file.

11. The method of claim 8, wherein the configuration file defines a host and a port used to start the selected automation testing tool prior to execution of the computer software test case.

12. The method of claim 8, wherein the status of the computer software test case execution indicates whether the computer software test case successfully executed.

13. The method of claim 8, wherein parsing the one or more reports to determine a status of the computer software test case execution comprises:

identifying, by the server computing device, one or more tool-specific errors associated with the computer software test case execution in the one or more reports; and classifying, by the server computing device, the identified tool-specific errors into at least one tool-agnostic error type.

14. The method of claim 13, wherein the software deployment system deploys the build when the status of the computer software test case execution indicates that the computer software test case successfully executed, and wherein the software deployment system reverts the application under development to an earlier build when the status of the computer software test case execution indicates that the computer software test case did not successfully execute.

15. A computer program product, tangibly embodied in a non-transitory computer readable storage device, for automated intelligent execution of computer software test cases, the computer program product including instructions that, when executed by a processor of a server computing device, cause the server computing device to:

identify a plurality of computer software test cases for execution using a set of input parameters comprising a URI for a file containing a list of computer software test cases; and for each computer software test case in the file:

scan code changes in a source code management system for source code associated with the computer software test case to retrieve one or more artifacts associated with the code changes, the artifacts comprising at least one of a file extension or a file name, identify a test type based upon the one or more artifacts, select an automation testing tool of a plurality of automation testing tools, each running on a separate computing device coupled to the server computing device, by mapping the test type to one of the automation testing tools using a mapping file stored on the server computing device, launch the selected automation testing tool using a tool-specific interface that comprises an interface class containing one or more methods implemented only for the selected automation testing tool, the tool-specific interface generated by loading one or more dependencies needed for operation of the selected automation testing tool, execute the computer software test case using the interface class for the selected automation testing tool, against one or more software applications under development, each located on a separate computing device coupled to the server computing device and each comprising a browser-based software application, by configuring the selected automation testing tool using a configuration file, and initiating execution of the selected automation testing tool using a build file, receive one or more reports from the automation testing tool that include results of the computer software test case execution, parse the one or more reports to determine a status of the computer software test case execution, and transmit the status of the computer software test case execution to each of a software development issue tracking system and a software deployment system, wherein the software development issue tracking system generates an issue ticket based upon the status of the computer software test case execution and assigns the issue ticket to a development workgroup for changing source code associated with one or more of the software applications under development, and wherein the software deployment system determines whether to deploy a build associated with the software application under development based upon the status of the computer software test case execution.

* * * * *

UNITED STATES PATENT AND TRADEMARK OFFICE
CERTIFICATE OF CORRECTION

PATENT NO.        : 10,162,740 B1
APPLICATION NO.   : 15/806163
DATED             : November 7, 2017
INVENTOR(S)       : Setty et al.

Page 1 of 1

It is certified that error appears in the above-identified patent and that said Letters Patent is hereby corrected as shown below:

At Line 4 of Claim 3 (Column 13, Line 63), delete "a tool"

Signed and Sealed this
Twenty-third Day of July, 2019

Andrei Iancu
*Director of the United States Patent and Trademark Office*